(12) United States Patent
Shimizu et al.

(10) Patent No.: US 9,169,126 B2
(45) Date of Patent: Oct. 27, 2015

(54) GENERALLY SPHERICAL BARIUM CARBONATE PARTICLES, AND METHOD FOR PRODUCING GENERALLY SPHERICAL BARIUM CARBONATE PARTICLES

(75) Inventors: Yusuke Shimizu, Fukushima (JP); Hiroyuki Izumikawa, Fukushima (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 778 days.

(21) Appl. No.: 13/254,599

(22) PCT Filed: Mar. 25, 2010

(86) PCT No.: PCT/JP2010/055230
§ 371 (c)(1),
(2), (4) Date: Nov. 4, 2011

(87) PCT Pub. No.: WO2010/113757
PCT Pub. Date: Oct. 7, 2010

(65) Prior Publication Data
US 2012/0045381 A1 Feb. 23, 2012

(30) Foreign Application Priority Data
Apr. 3, 2009 (JP) ................................. 2009-091205

(51) Int. Cl.
*B01D 53/62* (2006.01)
*C01F 11/18* (2006.01)
*C09C 1/02* (2006.01)

(52) U.S. Cl.
CPC ............... *C01F 11/188* (2013.01); *C09C 1/02* (2013.01); *C01P 2004/03* (2013.01); *C01P 2004/32* (2013.01); *C01P 2004/34* (2013.01); *C01P 2004/54* (2013.01); *C01P 2006/12* (2013.01); *Y10T 428/2982* (2015.01)

(58) Field of Classification Search
None
See application file for complete search history.

(56) References Cited

U.S. PATENT DOCUMENTS

| 3,920,800 A | 11/1975 | Harris |
| 6,479,029 B1 | 11/2002 | Mingels et al. |
| 6,777,335 B2 * | 8/2004 | Hasegawa ..................... 438/691 |
| 2010/0040885 A1 | 2/2010 | Ichimura et al. |

FOREIGN PATENT DOCUMENTS

| JP | 7-025611 | 1/1995 |
| JP | 11-514961 | 12/1999 |
| JP | 2000-185914 | 7/2000 |
| JP | 2004-059372 | 2/2004 |
| JP | 2007-176789 | 7/2007 |
| JP | 2008-266134 | 11/2008 |
| WO | 97/15530 | 5/1997 |
| WO | 2008/111612 | 9/2008 |

* cited by examiner

*Primary Examiner* — Anthony J Zimmer
*Assistant Examiner* — Daniel Berns
(74) *Attorney, Agent, or Firm* — Hamre, Schumann, Mueller & Larson, P.C.

(57) ABSTRACT

The present invention has an object to provide a method for producing particulate barium carbonate having desired properties such as high purity, fineness, and has a spherical shape. The present invention relates to a method of producing substantially spherical barium carbonate, including (A) mixing, in an aqueous medium, a barium compound with at least one first ingredient selected from the group consisting of gluconic acid or salts thereof, gluconolactone, glucoheptonic acid or salts thereof, and glucoheptonolactone, to prepare a mixture; and (B) reacting the barium compound with carbon dioxide or a water-soluble carbonate in the mixture, to produce substantially spherical barium carbonate.

9 Claims, 7 Drawing Sheets

GENERALLY SPHERICAL BARIUM CARBONATE PARTICLES, AND METHOD FOR PRODUCING GENERALLY SPHERICAL BARIUM CARBONATE PARTICLES

TECHNICAL FIELD

The present invention relates to substantially spherical barium carbonate which is suitable mainly for a material for electronic parts or for phosphors, a method for substantially spherical fine barium carbonate, and a composition containing substantially spherical barium carbonate.

BACKGROUND OF THE INVENTION

Barium carbonate is one of main raw materials of barium titanate, which is used for electronic materials. Recent development for downsizing and upgrade of electronic devices requires improvement of the capacity and performance of monolithic ceramic chip capacitors. For such improvement, barium titanate, which is a raw material of monolithic ceramic chip capacitors, has been required to have higher purity and finer size.

Barium titanate is generally produced by mixing barium carbonate and titanium dioxide in a wet form, and drying, followed by calcination. To produce high quality barium titanate, it is desired to perform uniform wet mixing and uniform calcination. A titanium dioxide particle has a relatively low aspect ratio (namely, more spherical). Thus, it is also desired to use barium carbonate with a low aspect ratio for uniform calcination.

Generally, barium carbonate, which can be used for electronic materials, is produced by first eliminating impurities from barium salts (such as barium hydroxide, barium chloride, barium nitrate) through, for example, recrystallization or filtration, then preparing an aqueous solution of purified barium salts, and blowing gaseous $CO_2$ to the aqueous solution, or mixing a solution of a water-soluble carbonate (ammonium carbonate, sodium carbonate, potassium carbonate, etc.) with the aqueous solution.

However, when barium carbonate fine particles are dispersed in water, particles tend to aggregate to decrease the surface energy of particles. Generally, the finer particles are, the higher aggregation force between particles is. Thus, finer particles tend to aggregate more firmly. Additionally, barium carbonate produced through a reaction of barium salts with gaseous $CO_2$ or a water-soluble carbonate generally has a spicular shape.

To produce uniform titanium dioxide from such spicular barium carbonate, methods which include fine grinding of spicular barium carbonate during mixing with titanium dioxide are conventionally employed. One of examples of such methods include the step of finely grinding spicular barium carbonate with a bead mill (in which zirconia beads, etc. are enclosed) in a wet state to finely grind particles to be almost spherical shape. However, sufficient strength of grinding is required and it takes long time to produce fine particles with a low aspect ratio. Thus, a special apparatus is generally required for such fine grinding.

Some trials to omit such a complicated and costly step of grinding have been made on processes of forming fine and spherical particles from raw material barium carbonate. Examples of chemical approaches in such trials include methods, which includes adding a carboxylic acid such as citric acid or tartaric acid, or pyrophosphoric acid during the reaction, as described in the Patent Document 1 or Patent Document 2.

As physical approaches, Patent Documents 3 and 4 suggest some methods for producing barium carbonate with a low aspect ratio by grinding synthesized spicular barium carbonate with a grinder which utilizes grinding by ceramic beads.

REFERENCES

Patent Documents

[Patent Document 1] JP 7-25611 A
[Patent Document 2] JP 2000-185914 A
[Patent Document 3] JP 2007-176789 A
[Patent Document 4] JP 2008-266134 A

SUMMARY OF THE INVENTION

Problem to be Solved by the Invention

Indeed, the methods described in Patent Documents 1 or 2 can easily achieve a specific surface area of the particles to be higher than 10 $m^2/g$ with a help of carboxylic acids or pyrophosphoric acid. However, the particles are in a spicular shape. In particular, when citric acid is added, particles can grow to be more spicular. Thus, it has been difficult by the methods described in Patent Document 1 or 2 to produce desired highly pure, spherical fine particles.

Meanwhile, a method of fine grinding using a bead mill has a risk of contamination of abrasion powder from grinding media. Specifically, it is difficult to avoid contamination of abrasion powder in grinding using a grinding media such as ceramic beads.

To produce uniform spherical particles from spicular barium carbonate by a method including a grinding step, sufficient grinding strength is needed for grinding barium carbonate particles, like the method utilizing fine grinding during mixing with titanium dioxide. Such methods require a special grinding apparatus, or a special grinding step, and therefore it is not satisfiable from the energy and cost viewpoints.

Thus, development of simple methods has been desired for producing barium carbonate particles having a spherical shape and desired characteristics such as high purity and fineness.

Means for Solving the Problem

Under these circumstances, the present inventors have found that specific compounds belonging to gluconic acid or its derivatives are effective to produce a spherical particles of barium carbonate, and have completed an invention relating to a method of producing uniform, substantially spherical (preferably, spherical) particles only by a synthetic step. The inventors have also found that, by the method, uniform spherical particles that contain substantially no impurities can be efficiently produced.

That is, a first aspect of the present invention relates to a method of producing substantially spherical barium carbonate, comprising:
(A) mixing, in an aqueous medium, a barium compound with at least one first ingredient (hereafter, also referred to as "gluconic acid-group component") selected from the group consisting of gluconic acid or salts thereof, gluconolactone, glucoheptonic acid or salts thereof, and glucoheptonolactone, to prepare a mixture; and
(B) reacting the barium compound with carbon dioxide or a water-soluble carbonate in the mixture, to produce substantially spherical barium carbonate.

In a preferable embodiment, the first ingredient is at least one selected from the group consisting of gluconic acid or salts thereof, and gluconolactone.

In another preferable embodiment, at least one step of the steps (A) and (B) is performed under the presence of at least one second ingredient selected from the group consisting of a polybasic carboxylic acid, a hydroxycarboxylic acid, and a salt of polybasic carboxylic acid or a salt of hydroxycarboxylic acid.

In a further preferable embodiment, the second ingredient is citric acid, tartaric acid, or a salt thereof.

A second aspect of the present invention relates to a substantially spherical barium carbonate having an aspect ratio represented by [(the length of the major axis)/(the length of the minor axis)] of not larger than 2.5.

In a preferable embodiment, the substantially spherical barium carbonate has a BET specific surface area of not less than 30 $m^2/g$.

A third aspect of the present invention relates to a substantially spherical barium carbonate composition, comprising:
barium carbonate; and
at least one first ingredient selected from the group consisting of gluconic acid or salts thereof, gluconolactone, glucoheptonic acid or salts thereof, and glucoheptonolactone, wherein the amount of the first ingredient is 0.1 to 5% by mass of the total mass of the composition, and the substantially spherical composition are particles having an aspect ratio represented by [(the length of the major axis)/(the length of the minor axis)] of not larger than 2.5.

Preferably, the first ingredient is at least one selected from the group consisting of gluconic acid, gluconic acid salt, and gluconolactone. Preferably, the composition has a BET specific surface area of not less than 30 $m^2/g$.

Effect of the Invention

According to the method of the invention, the method can provide substantially spherical barium carbonate having uniform particle shape and size, and having an aspect ratio of not larger than 2.5. Furthermore, fine substantially spherical barium carbonate can be obtained when the second ingredient selected from the group consisting of a polybasic carboxylic acid, a hydroxycarboxylic acid, and a salt of polybasic carboxylic acid or a salt of hydroxycarboxylic acid is added with the first ingredient such as gluconic acid. The ingredient like gluconic acid contributes to produce substantially spherical barium carbonate having an aspect ratio of not more than 2.5.

MODE FOR CARRYING OUT THE INVENTION

The present invention is described below in detail.
<Method of Producing Substantially Spherical Barium Carbonate>

A method of producing substantially spherical barium carbonate, which is the first aspect of the present invention, is described. The method includes the above steps (A) and (B).

First, the step (A) is explained. The step (A) includes mixing a barium compound with at least one first ingredient selected from the group consisting of gluconic acid or salts thereof, gluconolactone, glucoheptonic acid or salts thereof, and glucoheptonolactone in an aqueous medium, to prepare a mixture.

As mentioned above, conventional methods, which includes the steps of blowing gaseous $CO_2$ to a barium compound, or adding a water-soluble carbonates to react with a barium compound without any pretreatment, only provides spicular barium carbonate particles. The present inventors have found that substantially spherical particles of barium carbonate are produced by adding gluconic acid or glucoheptonic acid, or their derivative such as a salt or a lactone, before conversion from the barium compound into barium carbonate, to react with the barium compound, and thereby have completed the present invention. Thus, the method of the present invention is remarkable in that spherical particles are produced by a simple process using chemical techniques, whereas it has been difficult in a conventional chemical process.

The step (A) is now described specifically.

Examples of the barium compound include, but not limited to, water-soluble barium compounds such as barium hydroxide, barium chloride, barium nitrate, barium acetate, and barium oxide. Particularly, barium hydroxide is preferable in view of high solubility in water, and high reaction efficiency in shift reaction to barium carbonate.

Barium hydroxide is usually known as anhydride, monohydrate, or octahydrate. Any of anhydrides and hydrates may be used in the present invention. Commercially available products are commonly monohydrate or octahydrate. Otherwise, a solution form such as an aqueous solution of barium hydroxide may also be used.

In the step (A), at least one ingredient selected from the group consisting of gluconic acid or salts thereof, gluconolactone, glucoheptonic acid or salts thereof, and glucoheptonolactone is reacted with the barium compound. Examples of such salts includes, but not limited to, aqueous salts of alkaline metals such as sodium or potassium, or aqueous salts of alkaline-earth metals.

Gluconolactone, which is a δ lactone of gluconic acid, may also be used. Gluconic acid and gluconolactone are in equilibrium in an aqueous medium, and the equilibrium shifts to gluconic acid side in a basic condition. Thus, gluconolactone is expected to cause a similar effect to gluconic acid. Similarly, glucoheptonolactone may be used in place of glucoheptonic acid.

Examples of the aqueous medium to be used in the step (A) include, but not limited to, water, and a mixture of water with a water-soluble organic solvent such as methanol, ethanol, or acetone. The aqueous medium contains preferably 50 to 100 mass %, more preferably 75 to 100 mass %, still more preferably 90 to 100 mass %, and particularly preferably 100 mass % of water, although the proportion of water is not limited to any one of these.

Concentration of the barium compound in an aqueous medium [grams (mass of the barium compound)/Liter (volume of the aqueous medium)] is, but not limited to, preferably 10 to 500 g/L, and more preferably 100 to 400 g/L. Solubility varies depending on the salt used. In general, the higher the concentration is, the finer the particle size becomes. However, the barium compound tends to crystallize due to temperature variation when concentration gets close to saturation. As a result, problems such as clogged pipes may arise. To prevent such crystallization, heating is recommended to increase solubility. However, when the liquid temperature is heightened to increase the solubility, the temperature of the reaction mixture becomes higher, and as a result, excessive particle growth through ageing may be occurred. Thus, it is preferable both to keep the reaction temperature relatively low and to make a solution having the highest possible concentration at the temperature, especially when a fine product is desired.

The amount of the gluconic acid-group component is, but not limited to, preferably 5 to 100 mol %, more preferably 20 to 75 mol %, and still more preferably 40 to 50 mol % based on 100 mol % of barium ion in the barium compound. If the amount is too low, particles grow during the reaction, and particle size and shape tend to vary. The amount exceeding 10 mol % is also unfavorable because the effect of controlling shape of particles by addition of the component may be saturated, and further addition may only lead to increase in production cost.

The temperature during the step (A) is not particularly limited, and generally about 20 to 80° C., and preferably 30 to 60° C.

In the step (A), the period of time for the reaction of the barium compound and gluconic acid-group component is not particularly limited. The period is preferably 10 minutes to 12 hours, and more preferably 10 minutes to 3 hours.

Next, the step (B) is explained. The step (B) includes reaction between the barium compound and carbon dioxide or a water-soluble carbonates to produce barium carbonate.

In the step (B), either of carbon dioxide and a water-soluble carbonate may be used with a barium compound to cause reaction therebetween.

Carbon dioxide maybe used in a form of gas (gaseous $CO_2$) or solid (dry ice). Gaseous $CO_2$ may be preferred since it can be introduced in a simple and easy manner, and control of reaction temperature is easier.

Examples of the water-soluble carbonate include, but not limited to, ammonium carbonate, ammonium bicarbonate, sodium carbonate, potassium carbonate, and magnesium carbonate.

When a barium compound and carbon dioxide are used as raw materials, the reaction mixture theoretically contains no metals other than barium. Thus, highly pure barium carbonate which contains fewer amounts of residual salts can be obtained by the reaction between a barium compound and carbon dioxide. Carbon dioxide is preferable among carbon dioxide and water-soluble carbonates in this point, and gaseous $CO_2$ is preferable because introduction into the reaction mixture can be made in a simple and easy manner.

In the case where carbon dioxide is used, the amount of carbon dioxide to be introduced is preferably 80 to 500 mol %, and more preferably 200 to 300 mol % based on the amount of barium ions.

In a preferred embodiment, when the barium salt is a salt whose aqueous solution is basic, such as barium hydroxide or barium oxide, carbon dioxide is introduced so that the pH of reaction slurry (namely, slurry obtained after completion of the reaction between barium compound and carbon dioxide) is preferably not higher than 12, more preferably not higher than 8, and still more preferably not higher than 7.

When the water-soluble carbonate is used, the amount of water-soluble carbonate is preferably 100 to 150 mol %, and more preferably 110 to 120 mol % based on the amount of barium ions.

The temperature during generation reaction of barium carbonate is not particularly limited, and the reaction can be carried out, for example, preferably at 10 to 70° C., more preferably at 15 to 50° C., and still more preferably at 20 to 40° C.

The period for the generation reaction is not particularly limited, either, as long as the time is sufficient for generation of barium carbonate.

The generation reaction of barium carbonate is generally carried out by feeding a carbonate or an aqueous solution of a carbonate, or carbon dioxide in an aqueous solution or suspension of a barium compound. Continuous reaction is preferable to produce fine barium carbonate particles. Continuous reaction is particularly preferable especially on the reaction of a barium compound and gaseous $CO_2$. Example of a method using continuous reaction include, but not limited to, a method including feeding a barium compound from an inlet of a small-volume reaction vessel equipped with a high-speed rotating blade, while discharging a reaction product from an outlet. Specifically, such a continuous reaction can be performed in a casing of a pump, which serves as a reaction vessel. Reaction using gaseous $CO_2$ requires a sufficient-size vessel because it takes some period of time to dissolve a gaseous $CO_2$ in water. Thus, two or more pumps may be connected in series according to need. When a pump having large casing volume and high revolution is used, only one pump may be used. Examples of such a pump include centrifugal pumps and axial-flow pumps.

In a preferred embodiment, at least one step of the steps (A) and (B) is preferably performed under the presence of at least one ingredient (hereafter, also referred to as a "second ingredient" or otherwise a "carboxylic acid ingredient" in the description and claims) selected from the group consisting of a polybasic carboxylic acid, a hydroxycarboxylic acid, and a salt of polybasic carboxylic acid or a salt of hydroxycarboxylic acid. These carboxylic acid ingredients may serve to make particles finer.

The term "polybasic carboxylic acid" is to be understood as an organic acid that has two or more —COOH groups in a molecule. The hydroxycarboxylic acid is to be understood as an organic acid that has one or more —COOH groups and one or more —OH groups in a molecule. Polybasic carboxylic acid and hydroxycarboxylic acid are not clearly distinguishable, and some acidic compounds belong to both a category of polybasic carboxylic acid and a category of hydroxycarboxylic acids. For example, citric acid has three —COOH groups and one —OH group in a molecule, and therefore, it belongs to both a category of polybasic carboxylic acids and a category of hydroxycarboxylic acids.

Examples of the above polybasic carboxylic acid include, but not limited to, C3-12 aliphatic dicarboxylic acids such as malonic acid, succinic acid, glutaric acid, adipic acid, suberic acid, azelaic acid, sebacic acid, dodecanedioic acid, maleic acid, and fumaric acid; C6-12 aliphatic tricarboxylic acids such as tricarballylic acid (propanetricarboxylic acid), butanetricarboxylic acids, pentanetricarboxylic acids, hexanetricarboxylic acids, and octanetricarboxylic acids; monohydroxy di- or tri-carboxylic acids such as citric acid (including hydrates), iso-citric acid, tartaric acid, malic acid, and aconitic acid.

Examples of the above hydroxycarboxylic acids (hydroxy acids) include, but not limited to, the abovementioned monohydroxy di- or tri-carboxylic acids, as well as monohydroxy monocarboxylic acids such as glycolic acid, lactic acid, glyceric acid, mevalonic acid, leucinic acid, mevaldic acid, and pantoic acid.

Examples of the second ingredient also include, but not limited to, lithium, sodium, or potassium salts of the above polybasic carboxylic acids and hydroxycarboxylic acids.

Among these acids, citric acid, tartaric acid, or a salt thereof is preferable, and citric acid or its salt is preferable. Citric acid will effectively serve to generate fine particles, and increase the specific surface area of the particles. Thus, fine, spherical particulate barium carbonate can be obtained by combining both the effects of generating fine particles by citric acid and the effects of producing spherical particles by gluconic acid.

Although the time when the second ingredient is to be added is not limited, the second ingredient may be added at any time during the step (A) or (B). However, it is preferable to add the second ingredient after the addition of the first ingredient to enhance the reaction efficiency of the first ingredient, such as gluconic acid. It is more preferable to add the second ingredient (the carboxylic acid ingredient) simultaneously with carbon dioxide or a water-soluble carbonate, or immediately after the addition of carbon dioxide or a water-soluble carbonate (for example, in five minutes, more preferably in three minutes, still more preferably in one minute from the addition of carbon dioxide or a water-soluble carbonate) in the step (B) since fine particles may effectively be produced.

The amount of the second ingredient is generally 0 to 20 mol %, preferably 0.1 to 5 mol % based on 100 mol % of generated barium carbonate, although the amount varies depending on the type of the ingredient. The effect may be saturated when the second ingredient in an amount over 20 mol % is added, and the effect for fining particles is almost equal to the case where not higher than 20 mol % of the second ingredient is added. For efficiently producing fine particles using the second ingredient, 2 mol % or more of the second ingredient is preferably added. When 2 mol % or more of the second ingredient is added, the particulate material having a BET specific surface area of not lower than 40 m$^2$/g can be efficiently prepared.

If the second ingredient is added in the step (B), the period for treatment with the second ingredient is not particularly limited. It is preferable that particulate barium carbonate may be separated as soon as possible after the treatment with the second ingredient. Particularly, it is preferable to complete the step (B) within one hour, preferably 30 minutes, still more preferably 10 minutes, particularly preferably within five minutes from the addition of the second ingredient.

The temperature during the step (B) is not particularly limited, and generally, the step (B) can be performed at a room temperature. The pressure during the step (B) is not particularly limited, either, and generally, the step (B) can be performed at ordinary pressure.

According to need, slurry containing thus-produced barium carbonate can be filtrated, and then separated cake is washed, followed by drying, to isolate a desired barium carbonate. Dried cake can be optionally ground by a grinder or the like devices. This grinding is not one of fine grindings conducted to finely grind primary particles themselves, but is a process for loosening secondary or tertiary particles which temporarily aggregates together by drying into discrete primary particles. Thus, special apparatus is not necessary for this process, and general grinders may be used. Examples of such general grinders include apparatuses that generate substantially no debris. For example, stainless steel grinders can be mentioned.

In the method of the present invention, generated crystalline barium carbonate may be optionally aged. However, it is preferable to filtrate barium carbonate and then wash it with water immediately after the reaction without ageing because particle size may significantly increase as the ageing time extends.

Preferable, but non-limiting embodiment of the present invention is described below. In this embodiment, 50-wt % gluconic acid solution is added to barium hydroxide aqueous solution so that molar ratio of gluconic acid relative to barium hydroxide should be 5 to 200 mol %, desirably 10 to 75 mol %, and then the mixture is reacted with $CO_2$ to synthesize substantially spherical barium carbonate with a uniform particle size and shape, which has an aspect ratio of not larger than 2.5.

<Substantially Spherical Barium Carbonate>

Next, substantially spherical barium carbonate is explained as a second aspect of the present invention. Substantially spherical barium carbonate of the present invention is a product obtainable by the above method, and the aspect ratio of a particle represented by [(the length of the major axis)/(the length of the minor axis)] is not larger than 2.5. The aspect ratio may be defined as a ratio between the length of the long side of the minimum rectangle (also referred to as "(minimum) boundary rectangle") of a particle image and the length of the short side thereof [namely, (the length of the major axis)/(the length of the minor axis)], where the minimum rectangle is obtained from a top view of a particle, which can be obtained as a photographic image, etc. The length of the long side is referred to as "the length of the major axis", and the length of the short side is referred to as "the length of the minor axis". The closer to 1 the aspect ratio is, the closer to a sphere shape the particle is. Needless to say, the minimum of the aspect ratio of a particle is 1, which means that such a particle is spherical.

The aspect ratio is preferably 1 to 2.5, and more preferably 1 to 2.

The aspect ratio can be determined, for example, by the following way. First, an electron microphotograph of particles is taken, and then a projected bounding rectangle of each particle is defined. From the bounding rectangle, the aspect ratio can be determined by calculating the ratio, (the length of the major axis)/(the length of the minor axis). Particles close to spherical shape are preferred in that a mixture with other ingredients such as titanium dioxide will become uniform, and thus, high quality materials for dielectrics can be obtained.

In the preferred embodiment, the substantially spherical barium carbonate has a BET specific surface area of not less than 30 $m^2/g$. The larger the specific surface area is, the finer the particles are. The BET specific surface area is preferably not less than 40 $m^2/g$.

Substantially spherical barium carbonate having a BET specific surface area of not less than 30 $m^2/g$ can be produced efficiently with the help of the second ingredient, preferably citric acid. Citric acid is particularly preferable as the second ingredient because a particulate material having BET specific surface area of not less than 40 $m^2/g$ can be produced.

Methods for measuring a BET specific surface area are not particularly limited. A BET specific surface area can be easily measured, for example, by an apparatus for measuring a specific surface area based on a common theory known as BET method. Examples of such an apparatus for measuring specific surface area include, but are not limited to, a product named Macsorb, available from Mountech Co., Ltd.

<Substantially Spherical Barium Carbonate Composition>

A third aspect of the present invention relates to a substantially spherical barium carbonate composition, comprising barium carbonate and gluconic acid. The composition contains gluconic acid in an amount of 0.1 to 5 mass % of the total mass of the composition, and has an aspect ratio represented by [(the length of the major axis)/(the length of the minor axis)] of not larger than 2.5.

The above composition contains gluconic acid, and therefore, particles having a low aspect ratio, that is, almost spherical particles can be produced without any complex process. The amount of gluconic acid in the composition is, based on the 100 mass % of the total mass of the composition, preferably 0.1 to 3 mass %, more preferably 0.5 to 3 mass %, and particularly preferably 1.0 to 2.5 mass %, although it is not limited to these amount.

The composition of the present invention can contains other minor ingredient within the range that physical properties of the composition are not impaired.

The aspect ratio of the substantially spherical barium carbonate composition is preferably 1 to 2.5, and still more preferably 1 to 2. The aspect ratio can be determined in the same manner as mentioned above.

In a preferred embodiment, the substantially spherical barium carbonate has a BET specific surface area of not less than 30 $m^2/g$. The BET specific surface area is preferably not less than 40 $m^2/g$. The specific surface area can be determined in the same manner as mentioned above.

EXAMPLES

Hereafter, substantially spherical barium carbonate of the present invention and a method for producing the barium carbonate are explained in detail by illustrating non-limiting examples. In the following examples, values simply indicated as "%" means "mass %" unless otherwise indicated.

Example 1

Figure 1:
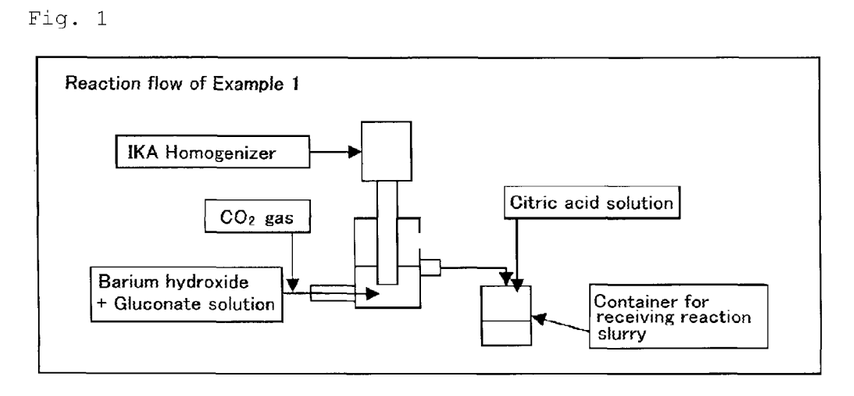
FIG. 1 illustrates a schematic view of reaction flow of Example 1.

Barium hydroxide octahydrate was dissolved in pure water to prepare a solution. To four separate flasks containing the solution, 50% gluconic acid solution (produced by FUSO Chemical Co., Ltd.) was added such that the concentration of gluconic acid should be 10, 30, 50, or 70 mol %, respectively, based on the mole of barium ion in barium hydroxide. Then, the solutions were diluted with pure water such that the final concentration of the solution should be 120 g/L based on the barium hydroxide octahydrate, to prepare an aqueous barium hydroxide-gluconic acid solution (referred to as "Raw material A") was prepared. The temperature of the solution at that time was adjusted to 50° C. In the reaction apparatus schematically illustrated in FIG. 1, the raw material A was fed into the reaction vessel at a flow rate of 300 ml/min. Simultaneously, gaseous $CO_2$ was fed into the reaction vessel at a flow rate of 9 L/min, and then the reaction mixture was stirred at high speed with IKA homogenizer (manufactured by IKA WORKS. INK, ULTRA-TURRAX T25 basic), to carry out a reaction. The pH of the slurry at the outlet of the reaction vessel was 10 to 11. The reaction was continued for 1 minute. The slurry was distributed in four flasks and then 15-g/L aqueous solution of citric acid monohydrate was added to the obtained slurry such that the amount of the citric acid monohydrate should be 0, 1, 2, or 3 mol %, respectively, based on the mole of generated barium carbonate. Slurry was filtrated and washed with water immediately, and obtained wet cakes were dried at 120° C. After drying, the dried product was ground in a grinder to produce powdery barium carbonate. The BET values of the barium carbonate were shown in Table 1. Electron microphotographs of the barium carbonate particles are illustrated in FIGS. 2 to 12.

Figure 13:
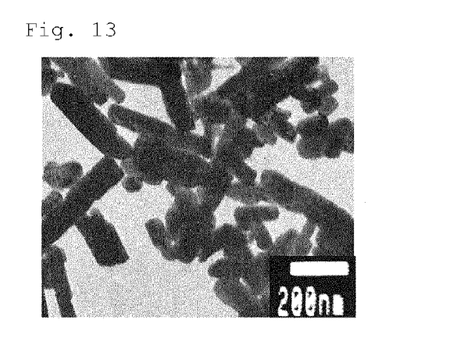
FIG. 13 shows a microphotograph of a commercially available highly pure grade barium carbonate, BW-KHR (available from Sakai Chemical Industry Co., Ltd.).
Figure 14:
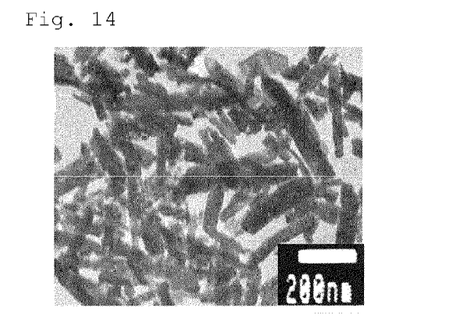
FIG. 14 shows a microphotograph of a commercially available highly pure grade barium carbonate, BW-KH 30 (available from Sakai Chemical Industry Co., Ltd.).

For comparison, Table 2 and FIGS. 13 and 14 respectively shows the BET specific surface area and electron microphotographs of commercially-available particulate barium carbonate obtained through a reaction of barium hydroxide and gaseous $CO_2$. As comparative commercially-available particulate barium carbonates, highly-pure grade barium carbonate products BW-KHR and BW-KH30 (produced by Sakai Chemical Industry Co., Ltd) were used.

Comparative Example 1

As a comparative Example, barium hydroxide octahydrate was dissolved in pure water to prepare a solution, the concentration of which was 120 g/L (referred to as "Raw material B"). The temperature of the solution at that time was adjusted to 50° C. In the reaction apparatus schematically illustrated in FIG. 1, the raw material B was fed into the reaction vessel at a flow rate of 300 ml/min. Simultaneously, gaseous $CO_2$ was fed into the reaction vessel at a flow rate of 9 L/min, and then the reaction mixture was stirred at high speed with IKA homogenizer (manufactured by IKA WORKS.INK, ULTRA-TURRAX T25 basic), to carry out a reaction. The pH of the slurry at the outlet of the reaction vessel was 10 to 11. The reaction was continued for 1 minute. The slurry was distributed in a flask and then 15-g/L aqueous solution of citric acid monohydrate was added to the obtained slurry such that the amount of the citric acid monohydrate should be 1 mol % based on the mole of generated barium carbonate. The slurry was immediately filtrated and washed with water, and obtained wet cakes were dried at 120° C. After drying, the dried product was ground in a grinder to produce powdery barium carbonate. The BET specific surface areas of the particulate barium carbonates were shown in Table 1. Electron microphotographs of the barium carbonate particles are shown in FIG. 19.

TABLE 1

Figure 2:
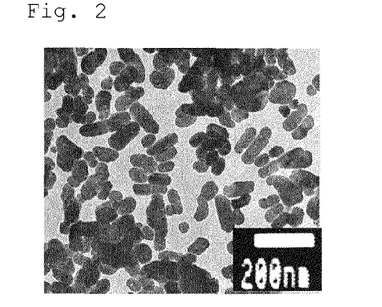
FIG. 2 shows an electron microphotograph of particles obtained in Example 1, in which gluconic acid was added in an amount of 10 mol % of barium hydroxide, but citric acid was not added.
Figure 3:
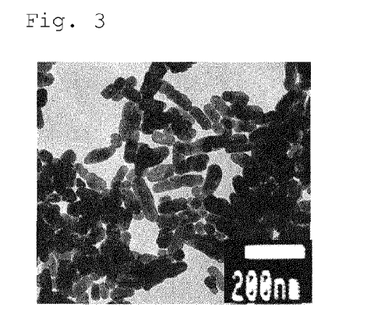
FIG. 3 shows an electron microphotograph of particles obtained in Example 1, in which gluconic acid was added in an amount of 10 mol % of barium hydroxide, and citric acid was added in an amount of 1 mol % of barium hydroxide.
Figure 4:
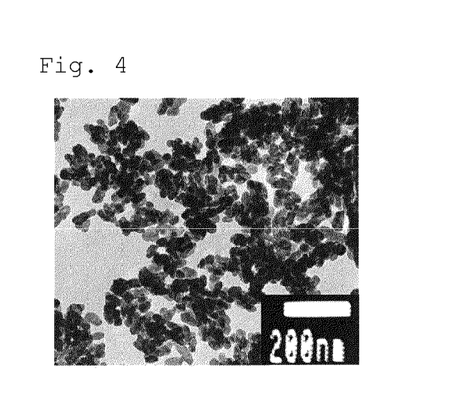
FIG. 4 shows an electron microphotograph of particles obtained in Example 1, in which gluconic acid was added in an amount of 10 mol % of barium hydroxide, and citric acid was added in an amount of 2 mol % of barium hydroxide.
Figure 5:
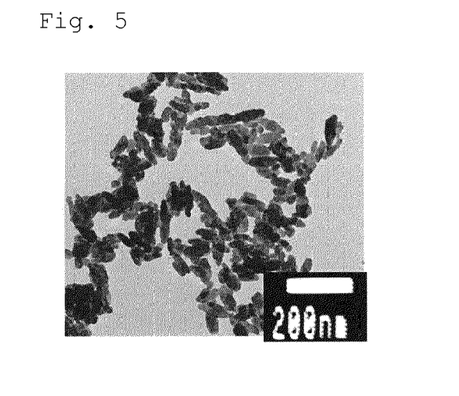
FIG. 5 shows an electron microphotograph of particles obtained in Example 1, in which gluconic acid was added in an amount of 10 mol % of barium hydroxide, and citric acid was added in an amount of 3 mol % of barium hydroxide.
Figure 6:
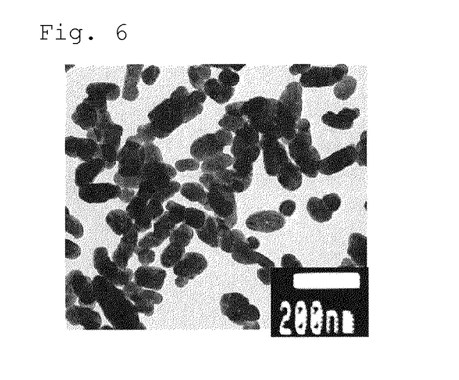
FIG. 6 shows an electron microphotograph of particles obtained in Example 1, in which gluconic acid was added in an amount of 30 mol % of barium hydroxide, and citric acid was added in an amount of 1 mol % of barium hydroxide.
Figure 7:
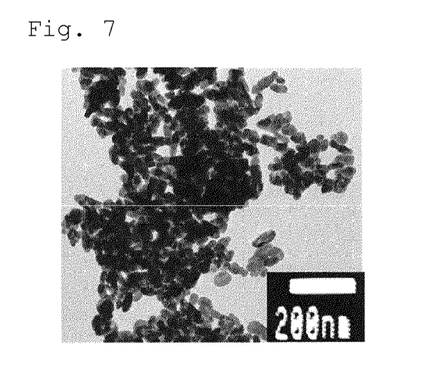
FIG. 7 shows an electron microphotograph of particles obtained in Example 1, in which gluconic acid was added in an amount of 30 mol % of barium hydroxide, and citric acid was added in an amount of 2 mol % of barium hydroxide.
Figure 8:
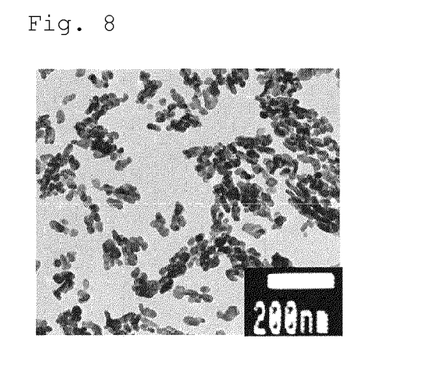
FIG. 8 shows an electron microphotograph of particles obtained in Example 1, in which gluconic acid was added in an amount of 30 mol % of barium hydroxide, and citric acid was added in an amount of 3 mol % of barium hydroxide.
Figure 9:
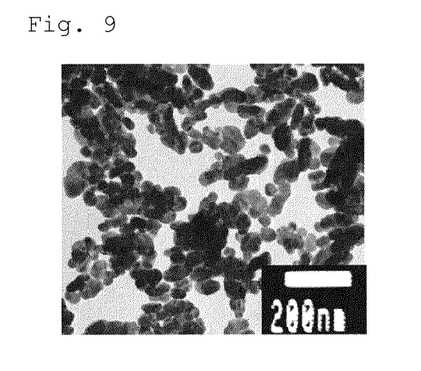
FIG. 9 shows an electron microphotograph of particles obtained in Example 1, in which gluconic acid was added in an amount of 50 mol % of barium hydroxide, and citric acid was added in an amount of 1 mol % of barium hydroxide.
Figure 10:
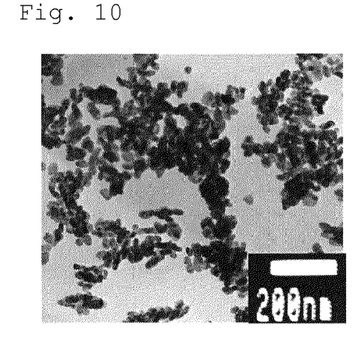
FIG. 10 shows an electron microphotograph of particles obtained in Example 1, in which gluconic acid was added in an amount of 50 mol % of barium hydroxide, and citric acid was added in an amount of 2 mol % of barium hydroxide.
Figure 11:
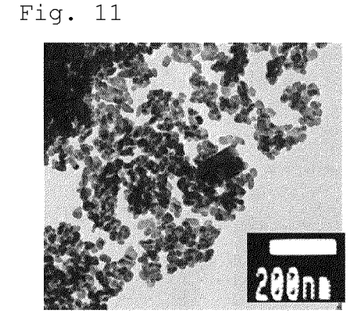
FIG. 11 shows an electron microphotograph of particles obtained in Example 1, in which gluconic acid was added in an amount of 50 mol % of barium hydroxide, and citric acid was added in an amount of 3 mol % of barium hydroxide.
Figure 12:
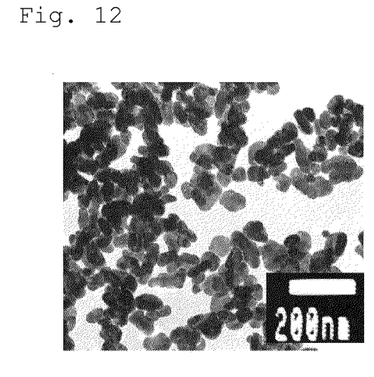
FIG. 12 shows an electron microphotograph of particles obtained in Example 1, in which gluconic acid was added in an amount of 70 mol % of barium hydroxide, and citric acid was added in an amount of 1 mol % of barium hydroxide.
Figure 19:
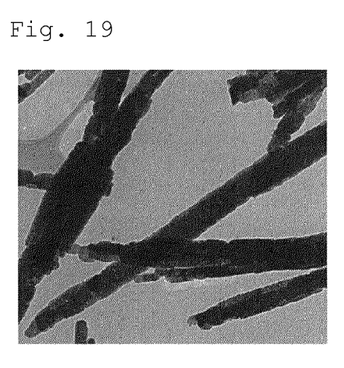
FIG. 19 shows an electron microphotograph of particles obtained in Comparative Example 1.

| | | Amount of citric acid | | | |
|---|---|---|---|---|---|
| Amount of gluconic acid | | 0 mol % | 1 mol % | 2 mol % | 3 mol % |
| Example 1 | 10 mol % | 12.5 $m^2$/g [FIG. 2] | 24.6 $m^2$/g [FIG. 3] | 45.1 $m^2$/g [FIG. 4] | 46.2 $m^2$/g [FIG. 5] |
| | 30 mol % | — | 27.5 [FIG. 6] | 46.3 [FIG. 7] | 61.0 [FIG. 8] |
| | 50 mol % | — | 33.6 [FIG. 9] | 44.3 [FIG. 10] | 63.7 [FIG. 11] |
| | 70 mol % | — | 36.6 [FIG. 12] | — | — |
| Comparative Example 1 | 0 mol % | — | 16.6 [FIG. 19] | — | — |

Electron microphotographs shows that, as the amount of gluconic acid added to barium hydroxide increase, obtained barium carbonate particles approached to a spherical shape (FIG. 2->FIG. 5->FIG. 8->FIG. 11). BET specific surface areas were increased as the amount of gluconic acid increases. Thus, particle size became slightly smaller by the addition of gluconic acid. The results also shows that the BET specific surface area could be adjusted depending on the amount of citric acid added immediately after the reaction, and 2 mol % or more of citric acid helped to produce a fine particulate material with a BET specific surface area of not less than 40 $m^2$/g or in an easy manner (FIG. 2->FIG. 3->FIG. 4->FIG. 5, FIG. 6->FIG. 7->FIG. 8 or 9 ->FIG. 10->FIG. 11).

The electron microphotograph shows that particles of each of the samples obtained in Example 1 had almost spherical shapes as clearly found by comparison with commercially-available highly-pure barium carbonate produced through a reaction of barium hydroxide and gaseous $CO_2$. This result can be concluded that gluconic acid could inhibit growth of barium carbonate into a spicular shape.

TABLE 2

| Sample | BW-KHR (Sakai Chemical) | BW-KH30 (Sakai Chemical) |
|---|---|---|
| Electron Microphotograph | FIG. 13 | FIG. 14 |
| BET | 12.5 $m^2$/g | 31.2 $m^2$/g |

Example 2

Figure 15:
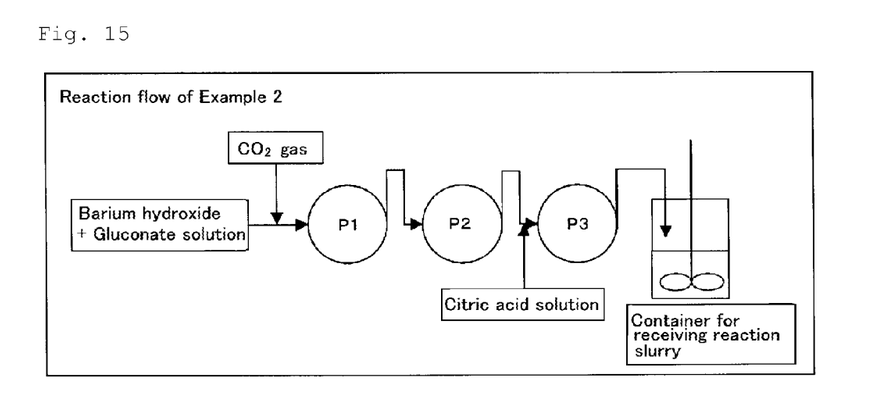
FIG. 15 illustrates a schematic view of reaction flow of Example 2.

Barium carbonate was produced in a larger scale with reference to the results of Example 1. Reaction apparatus used in this Example 2 included sequentially-connected, three pumps P1, P2 and P3, as illustrated in FIG. 15. The pumps used are the followings. Here, 1 inch (in)=about 2.54 cm.

(a) First phase pump P1: a centrifugal pump (manufactured by RASA CORPORATION), inlet diameter: 1.5 in, outlet diameter: 1 in, discharging rate : 170 L/min, impeller revolution: 2,080 rpm (b) Second phase pump P2: a centrifugal pump (manufactured by RASA CORPORATION), inlet diameter: 1 in, outlet diameter: ¾ in, discharging rate: 30 L/min, impeller revolution: 1,420 rpm (c) Third phase pump P3: a centrifugal pump (manufactured by PACIFIC METALS Co., Ltd.), inlet diameter: 1 in, outlet diameter: ¾ in, discharging rate: 30 L/min, impeller revolution: 1,420 rpm Barium hydroxide octahydrate (48 kg) was dissolved in pure water, and then gluconic acid was added in an amount corresponding to 50 mol % of barium hydroxide. Then, the total volume was adjusted by adding pure water to finally prepare a 400 L of barium hydroxide aqueous solution (referred to as "Raw material C"). The temperature of the solution at that time was adjusted to 50° C. In the reaction apparatus schematically illustrated in FIG. 15, the raw material C was fed into the pump P1 from the inlet at a flow rate of 12 L/min. Simultaneously, gaseous $CO_2$ was fed into the flow channel to the pump P1 so that pH of the reaction mixture should be 6.4 to 6.5, to cause continuous reaction in the pumps P1, P2 and P3. Here, to reaction slurry discharged from the outlet of the second phase pump P2, 15-g/L aqueous solution of citric acid monohydrate was added such that the amount of the citric acid monohydrate should be 1 or 2 mol % based on the mole of generated barium carbonate. The reaction ratio at the outlet of the pump P3 was 98%. The slurry was immediately filtrated and washed with water, and obtained wet cakes were dried at 120° C. After drying, the dried product was ground in a grinder to produce particulate barium carbonate. The electron microphotographs and the BET specific surface areas of the particles were illustrated in Table 3, and FIGS. 16 and 17, respectively. For comparison, the BET specific surface area and the electron microphotograph of a commercially-available barium carbonate, BW-KH30 (manufactured by Sakai Chemical Industry Co., Ltd) are illustrated in Table 3 and FIG. 18, respectively. The aspect ratios were determined on a sample, obtained by adding 1 mol % of citric acid in Example 2, and the commercially-available highly-pure barium carbonate. The aspect ratio was determined by observing 1,000 particles, selected at random, of barium carbonate in electron microphotograph image, and measuring lengths of the major axis and the minor axis of the particle, and calculating an average of the ratio between the lengths of major axis and minor axis.

Furthermore, the gluconic acid concentration was measured on two types of barium carbonate obtained in Example 2, and a commercially-available barium carbonate BW-KH30, which was mentioned above. Measuring method is explained below.

(Method of Analyzing Gluconic Acid Concentration)

One-gram portion of barium carbonate was dissolved in 5 ml of 99% acetic acid (extra pure grade). The solution was diluted with pure water such that the total amount of the solution should be 1 L. Thus, a sample for measurement was prepared. The gluconic acid content in the sample for measurement was measured by ion chromatography (using ION CHROMATOGRAPH IC-2001, manufactured by Tosoh Corporation). Elute used on measuring was sodium carbonate-sodium hydrogen carbonate mixed solution. Sodium carbonate-sodium hydrogen carbonate mixed solution was prepared by dissolving 0.0468 g of a sodium carbonate reagent (extra pure grade) and 0.0636 g of a sodium hydrogen carbonate reagent (extra pure grade) in an appropriate amount of distilled water to prepare a solution, and then, in a graduated cylinder, distilled water was further added to the solution such that the total amount of the solution should be 1 L. Separation column was TSK gel Super IC-AP. Suppresser gel was TSK suppress IC-A. Calibration curve was made using test samples, prepared by dissolving a potassium gluconate reagent (extra pure grade) in distilled water, and then adjusted such that gluconic acid concentration should be 10 ppm, 25 ppm, or 50 ppm, respectively. Table 3 shows the results.

TABLE 3

Figure 16:
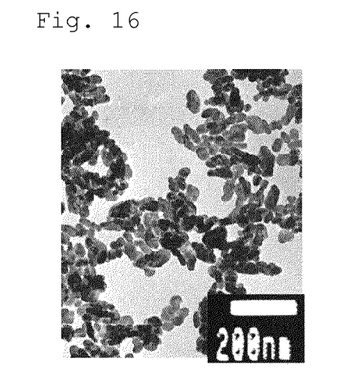
FIG. 16 shows an electron microphotograph of particles obtained in Example 2, in which citric acid was added in an amount of 1 mol % of barium hydroxide.
Figure 17:
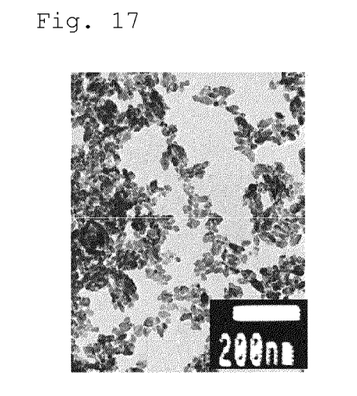
FIG. 17 shows an electron microphotograph of particles obtained in Example 2, in which citric acid was added in an amount of 2 mol % of barium hydroxide.
Figure 18:
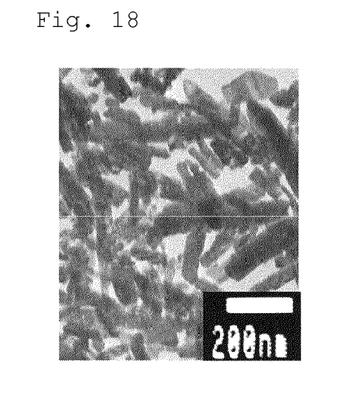
FIG. 18 shows a microphotograph of a commercially available barium carbonate, BW-KH 30 (available from Sakai Chemical Industry Co., Ltd.).

| Sample | Example 2 | | BW-KH30 (Sakai Chemical) |
|---|---|---|---|
| Electron Microphotograph | FIG. 16 | FIG. 17 | FIG. 18 |
| Citric acid | 1 mol % | 2 mol % | — |
| BET | 52.4 m$^2$/g | 70.3 m$^2$/g | 31.2 m$^2$/g |
| Aspect ratio | 1.8 | — | 4.0 |
| Concentration of Residual gluconic acid | 1.11 mass % | 1.53 mass % | Not detected |

Thus, gluconic acid-group component serves to produce a substantially spherical particulate barium carbonate having a reduced aspect ratio of 2 or lower without any physical fine grinding using bead mill or the like grinders. This technique can be used widely, and can be applied to produce particulate barium carbonate having 10 m$^2$/g or less. The technique can avoid a risk of contamination of abrasion powder, which frequently causes problem in fine grinding.

INDUSTRIAL APPLICABILITY

Barium carbonate produced by the method of the present invention is useful as a main raw material of barium titanate, which is one of electronic materials. Along with the recent development for downsizing and upgrade of electronic devices, capacity of monolithic ceramic chip capacitors increases. As a result, highly pure, finer products are required for not only barium titanate, which is used for monolithic ceramic chip capacitors, but also barium carbonate, which is a raw material of the barium titanate. The particulate barium carbonate produced by the present invention sufficiently meets such requirements for highly pure, finer products.

The invention claimed is:

1. A method of producing substantially spherical barium carbonate particles, comprising:
  (A) mixing, in an aqueous medium, a barium compound with at least one first ingredient selected from the group consisting of gluconic acid, salts of gluconic acid, gluconolactone, glucoheptonic acid, salts of glucoheptonic acid, and glucoheptonolactone, so as to prepare a mixture; and
  (B) reacting the barium compound with carbon dioxide or a water-soluble carbonate, in the mixture, whereby, without employing a grinding step, the substantially spherical barium carbonate particles are produced,
  wherein the step (B) is performed in the presence of at least one second ingredient selected from the group consisting of polybasic carboxylic acid, hydroxycarboxylic acid, salts of polybasic carboxylic acid, and salts of hydroxycarboxylic acid, which is present in the mixture in an amount of 0.1 to 5 mol % based on 100 mol % of spherical barium carbonate particles produced.

2. The method according to claim 1, wherein the barium compound is barium hydroxide.

3. The method according to claim 1, wherein the first ingredient is at least one compound selected from the group consisting of the gluconic acid, the salts of gluconic acid, and the gluconolactone.

4. The method according to claim 1, wherein the second ingredient is citric acid, or tartaric acid, or a salt thereof.

5. The method according to claim 1, wherein the second ingredient is added to the mixture simultaneously with, or within five minutes after, a contact between the carbon dioxide or the water-soluble carbonate and the mixture in the step (B).

6. The method according to claim 1, wherein the second ingredient is added to the mixture within five minutes after a contact between the carbon dioxide or the water-soluble carbonate and the mixture in the step (B).

7. The method according to claim 1, wherein the amount of the first ingredient is 30 to 100 mol % based on 100 mol % of barium ion in the barium compound.

8. The method according to claim 1, an aspect ratio of a particle in the substantially spherical barium carbonate particles represented by (a length of the major axis)/(a length of the minor axis) is in a range of 1-2.5:1.

9. The method according to claim 1, wherein the substantially spherical barium carbonate particles are subjected to grinding to break up aggregates thereof.

* * * * *